(12) United States Patent
Tsujii et al.

(10) Patent No.: US 8,204,360 B2
(45) Date of Patent: Jun. 19, 2012

(54) RECORDING APPARATUS, RECORDING METHOD AND RECORD MEDIUM

(75) Inventors: Satoshi Tsujii, Tokyo (JP); Makoto Yamada, Tokyo (JP); Toshihiro Ishizaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1133 days.

(21) Appl. No.: 12/047,440

(22) Filed: Mar. 13, 2008

(65) Prior Publication Data

US 2008/0159723 A1    Jul. 3, 2008

Related U.S. Application Data

(63) Continuation of application No. 09/663,731, filed on Sep. 15, 2000, now Pat. No. 7,539,399.

(30) Foreign Application Priority Data

Sep. 17, 1999 (JP) .................................. 11-264631

(51) Int. Cl.
*H04N 9/80* (2006.01)
(52) U.S. Cl. ................... 386/241; 386/232; 386/239
(58) Field of Classification Search .................. 386/240, 386/241, 248
See application file for complete search history.

(56) References Cited

U.S. PATENT DOCUMENTS

| | | | | |
|---|---|---|---|---|
| 4,777,537 A | * | 10/1988 | Ueno et al. .................... | 386/239 |
| 5,627,335 A | * | 5/1997 | Rigopulos et al. .............. | 84/635 |
| 5,852,800 A | * | 12/1998 | Modeste et al. ........... | 704/270.1 |
| 6,181,870 B1 | * | 1/2001 | Okada et al. .................. | 386/241 |
| 6,208,005 B1 | * | 3/2001 | Mitra ............................. | 257/442 |
| 7,027,717 B1 | * | 4/2006 | Tsujii et al. ................... | 386/232 |

FOREIGN PATENT DOCUMENTS

| | | |
|---|---|---|
| EP | 0 424 903 | 5/1991 |
| EP | 0 535 832 | 4/1993 |
| EP | 0 667 713 | 8/1995 |
| EP | 0 709 843 | 5/1996 |
| EP | 0 797 204 | 9/1997 |
| EP | 0 847 199 | 6/1998 |

(Continued)

OTHER PUBLICATIONS

Inside QuickTime: QuickTime File Format, by Apple Computer, Inc., Publication Date: 2000; pp. 1351 (http://developer.apple.com/documentation/QuickTime/QTFF/qtff.pdf).

*Primary Examiner* — Jamie Atala
(74) *Attorney, Agent, or Firm* — Frommer Lawrence & Haug LLP; William S. Frommer (57) ABSTRACT

A recording apparatus for recording video data to a record medium is disclosed, that comprises an encoding means for encoding video data in a group structure of a plurality of frames corresponding to a compression-encoding process in a combination of an inter-frame predictive encoding process and a motion compensative process, a transforming means for transforming the data structure of encoded video data that is output from the encoding means into a file structure that can be processed by a computer software program without a dedicated hardware portion so that moving pictures and so forth are synchronously reproduced, and a recording means for recording data having the file structure to a record medium, wherein the file structure has a first data unit and a second data unit, the second data unit being a set of the first data units, and wherein at least one data structure is matched with the first data unit.

16 Claims, 9 Drawing Sheets

FOREIGN PATENT DOCUMENTS

| | | |
|---|---|---|
| EP | 0 905 699 | 3/1999 |
| EP | 1 089 572 | 4/2001 |
| JP | 8 339637 | 12/1996 |
| JP | 10 79918 | 3/1998 |
| JP | 10 210409 | 8/1998 |
| WO | WO 99/37056 | 7/1999 |
| WO | WO 99/37057 | 7/1999 |
| WO | WO 99/37072 | 7/1999 |

* cited by examiner

RECORDING APPARATUS, RECORDING METHOD AND RECORD MEDIUM

This is a continuation of application Ser. No. 09/663,731, filed Sep. 15, 2000 now U.S. Pat. No. 7,539,399, which is entitled to the priority filing date of Japanese application 11-264631 filed in Japan on Sep. 17, 1999, the entirety of which is incorporated herein by reference.

BACKGROUND OF THE INVENTION

1. Field of the Invention

The present invention relates to a recording apparatus, a recording method, and a record medium that allow accessibility and editing efficiency to be improved.

2. Description of the Related Art

In recent years, as a multi-media system software program, QuickTime is known. The QuickTime is a software program that allows data that varies on time base (this data is referred to as movie) to be handled. A movie contains a moving picture, a voice, and a text. Currently, a QuickTime file format is available as a Macintosh platform of Apple. The QuickTime file format is an MPEG-1 (Moving Picture Experts Group phase 1) program stream file storage format of which a video elementary stream and an audio elementary stream are multiplexed on time base). In the storage format, the entire MPEG-1 file (namely, one whole closed scene) is treated as a sample of the QuickTime file format regardless of the duration thereof. Such a large sample is treated as one large chunk.

In addition, audio data and video data are stored together on one track (or one medium) in the QuickTime file format. As a new medium type that represents such data portions contained in a large sample or a large chunk, MPEG Media has been defined.

However, the accessibility and editing efficiency of a particular type of data contained in a large sample deteriorate. To allow a computer to reproduce and edit a QuickTime movie file, video data and audio data recorded on a record medium (for example, an optical disc) of the portable recording and reproducing apparatus with built-in camera may be converted into a QuickTime file format. In this case, the accessibility and editing efficiency of a particular type of data should be further improved. This problem applies to an audio data recording and reproducing apparatus as well as such a video data recording and reproducing apparatus.

OBJECTS AND SUMMARY OF THE INVENTION

Therefore, an object of the present invention is to provide a recording apparatus, a recording method, and a record medium that allow the accessibility and editing efficiency to be improved in the case that data having a file structure corresponding to a multimedia data format such as Quick-Time is recorded to a record medium.

A first aspect of the present invention is a recording apparatus for recording video data to a record medium, comprising an encoding means for encoding video data in a group structure of a plurality of frames corresponding to a compression-encoding process in a combination of an inter-frame predictive encoding process and a motion compensative process, a transforming means for transforming the data structure of encoded video data that is output from the encoding means into a file structure that can be processed by a computer software program without a dedicated hardware portion so that moving pictures and so forth are synchronously reproduced, and a recording means for recording data having the file structure to a record medium, wherein the file structure has a first data unit and a second data unit, the second data unit being a set of the first data units, and wherein at least one data structure is matched with the first data unit.

A second aspect of the present invention is a recording apparatus for recording video data to a rewritable optical disc, comprising an encoding means for encoding video data corresponding to a compression-encoding process, a transforming means for transforming the data structure of encoded video data that is output from the encoding means into a file structure that can be processed by a computer software program without a dedicated hardware portion so that moving pictures and so forth are synchronously reproduced, and a recording means for recording data having the file structure to an optical disc, wherein the file structure has a first data unit and a second data unit, the second data unit being a set of the first data units, and wherein the second data unit is matched with a successive record length of data written to the optical disc.

A third aspect of the present invention is a recording apparatus for recording audio data to a rewritable optical disc, comprising a transforming means for transforming the data structure of audio data or encoded audio data into a file structure that can be processed by a computer software program without a dedicated hardware portion so that moving pictures and so forth are synchronously reproduced, and a recording means for recording data having the file structure to the optical disc, wherein the file structure has a first data unit and a second data unit, the second data unit being a set of the first data units, and wherein the second data unit is matched with a successive record length of data written to the optical disc.

A fourth aspect of the present invention is a recording apparatus for recording video data and audio data to a record medium, comprising a video encoding means for encoding video data in a group structure of a plurality of frames corresponding to a compression-encoding process in a combination of an inter-frame predictive encoding process and a motion compensative process, an audio output means for outputting compression-encoded or non-compressed audio data, a means for transforming the data structure of encoded video data that is output from the video encoding means and audio data that is output from the audio output means into a file structure that can be processed by a computer software program without a dedicated hardware portion so that moving pictures and so forth are synchronously reproduced and multiplexing the encoded video data and the audio data having the file structure, and a recording means for recording multiplexed data having the file structure to a record medium, wherein the file structure has a first data unit and a second data unit, the second data unit being a set of the first data units, and wherein at least one data structure of the encoded video data is matched with the first data unit.

A fifth aspect of the present invention is a recording apparatus for recording video data and audio data to a rewritable optical disc, comprising a video encoding means for encoding video data in a group structure of a plurality of frames corresponding to a compression-encoding process in a combination of an inter-frame predictive encoding process and a motion compensative process, an audio output means for outputting compression-encoded or non-compressed audio data, a means for transforming the data structure of encoded video data that is output from the video encoding means and audio data that is output from the audio output means into a file structure that can be processed by a computer software program without a dedicated hardware portion so that moving pictures and so forth are synchronously reproduced and multiplexing the encoded video data and the audio data having the file structure, and a recording means for recording multiplexed data having the file structure to an optical disc, wherein the file structure has a first data unit and a second data unit, the second data unit being a set of the first data units, and wherein the second data unit is matched with a successive record length of which data is successively written to the optical disc.

A sixth aspect of the present invention is a recording method for recording video data to a record medium, comprising the steps of encoding video data in a group structure of a plurality of frames corresponding to a compression-encoding process in a combination of an inter-frame predictive encoding process and a motion compensative process, transforming the data structure of encoded video data into a file structure that can be processed by a computer software program without a dedicated hardware portion so that moving pictures and so forth are synchronously reproduced, and recording data having the file structure to a record medium, wherein the file structure has a first data unit and a second data unit, the second data unit being a set of the first data units, and wherein at least one data structure is matched with the first data unit.

A seventh aspect of the present invention is a recording method for recording video data to a rewritable optical disc, comprising the steps of encoding video data corresponding to a compression-encoding process, transforming the data structure of encoded video data into a file structure that can be processed by a computer software program without a dedicated hardware portion so that moving pictures and so forth are synchronously reproduced, and recording data having the file structure to an optical disc, wherein the file structure has a first data unit and a second data unit, the second data unit being a set of the first data units, and wherein the second data unit is matched with a successive record length of data written to the optical disc.

An eighth aspect of the present invention is a recording method for recording audio data to a rewritable optical disc, comprising the steps of transforming the data structure of audio data or encoded audio data into a file structure that can be processed by a computer software program without a dedicated hardware portion so that moving pictures and so forth are synchronously reproduced, and recording data having the file structure to the optical disc, wherein the file structure has a first data unit and a second data unit, the second data unit being a set of the first data units, and wherein the second data unit is matched with a successive record length of data written to the optical disc.

A ninth aspect of the present invention is a recording method for recording video data and audio data to a record medium, comprising the steps of encoding video data in a group structure of a plurality of frames corresponding to a compression-encoding process in a combination of an inter-frame predictive encoding process and a motion compensative process, outputting compression-encoded or non-compressed audio data, transforming the data structure of encoded video data and audio data into a file structure that can be processed by a computer software program without a dedicated hardware portion so that moving pictures and so forth are synchronously reproduced and multiplexing the encoded video data and the audio data having the file structure, and recording multiplexed data having the file structure to a record medium, wherein the file structure has a first data unit and a second data unit, the second data unit being a set of the first data units, and wherein at least one data structure of the encoded video data is matched with the first data unit.

A tenth aspect of the present invention is a recording method for recording video data and audio data to a rewritable optical disc, comprising the steps of encoding video data in a group structure of a plurality of frames corresponding to a compression-encoding process in a combination of an inter-frame predictive encoding process and a motion compensative process, outputting compression-encoded or non-compressed audio data, transforming the data structure of encoded video data and audio data into a file structure that can be processed by a computer software program without a dedicated hardware portion so that moving pictures and so forth are synchronously reproduced and multiplexing the encoded video data and the audio data having the file structure, and recording multiplexed data having the file structure to an optical disc, wherein the file structure has a first data unit and a second data unit, the second data unit being a set of the first data units, and wherein the second data unit is matched with a successive record length of which data is successively written to the optical disc.

An eleventh aspect of the present invention is a record medium on which a program for recording video data to a record medium has been recorded, the program causing a computer to perform the steps of encoding video data in a group structure of a plurality of frames corresponding to a compression-encoding process in a combination of an inter-frame predictive encoding process and a motion compensative process, transforming the data structure of encoded video data into a file structure that can be processed by a computer software program without a dedicated hardware portion so that moving pictures and so forth are synchronously reproduced, and recording data having the file structure to a record medium, wherein the file structure has a first data unit and a second data unit, the second data unit being a set of the first data units, and wherein at least one data structure is matched with the first data unit.

A twelfth aspect of the present invention is a record medium on which a program for recording video data to a rewritable optical disc has been recorded, the program causing a computer to perform the steps of encoding video data corresponding to a compression-encoding process, transforming the data structure of encoded video data into a file structure that can be processed by a computer software program without a dedicated hardware portion so that moving pictures and so forth are synchronously reproduced, and recording data having the file structure to an optical disc, wherein the file structure has a first data unit and a second data unit, the second data unit being a set of the first data units, and wherein the second data unit is matched with a successive record length of data written to the optical disc.

A thirteenth aspect of the present invention is a record medium on which a program for recording audio data to a rewritable optical disc has been recorded, the program causing a computer to perform the steps of transforming the data structure of audio data or encoded audio data into a file structure that can be processed by a computer software program without a dedicated hardware portion so that moving pictures and so forth are synchronously reproduced, and recording data having the file structure to the optical disc, wherein the file structure has a first data unit and a second data unit, the second data unit being a set of the first data units, and wherein the second data unit is matched with a successive record length of data written to the optical disc.

A fourteenth aspect of the present invention is a record medium on which a program for recording video data and audio data to a record medium has been recorded, the program causing a computer to perform the steps of encoding video data in a group structure of a plurality of frames corresponding to a compression-encoding process in a combination of an inter-frame predictive encoding process and a motion compensative process, outputting compression-encoded or non-compressed audio data, transforming the data structure of encoded video data and audio data into a file structure that can be processed by a computer software program without a dedicated hardware portion so that moving pictures and so forth are synchronously reproduced and multiplexing the encoded video data and the audio data having the file structure, and recording multiplexed data having the file structure to a record medium, wherein the file structure has a first data unit and a second data unit, the second data unit being a set of the first data units, and wherein at least one data structure of the encoded video data is matched with the first data unit.

A fifteenth aspect of the present invention is a record medium on which a program for recording video data and audio data to a rewritable optical disc has been recorded, the program causing a computer to perform the steps of encoding video data in a group structure of a plurality of frames corresponding to a compression-encoding process in a combination of an inter-frame predictive encoding process and a motion compensative process, outputting compression-encoded or non-compressed audio data, transforming the data structure of encoded video data and audio data into a file structure that can be processed by a computer software program without a dedicated hardware portion so that moving pictures and so forth are synchronously reproduced and multiplexing the encoded video data and the audio data having the file structure, and recording multiplexed data having the file structure to an optical disc, wherein the file structure has a first data unit and a second data unit, the second data unit being a set of the first data units, and wherein the second data unit is matched with a successive record length of which data is successively written to the optical disc.

According to the present invention, since at least one GOP in MPEG compression video corresponds to a data unit of such as a QuickTime file, each of plurality of types of data can be accessed and edited. When a data having a file structure is recorded to an optical disc, since the successive record length corresponds to a second data unit (for example, a chunk of QuickTime), the accessibility and editing efficiency can be improved.

The applicant of the present invention has the following US patents as prior patents thereof.
(1) U.S. Pat. No. 4,945,475
(2) U.S. Pat. No. 5,253,053
(3) U.S. Pat. No. 5,652,879

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
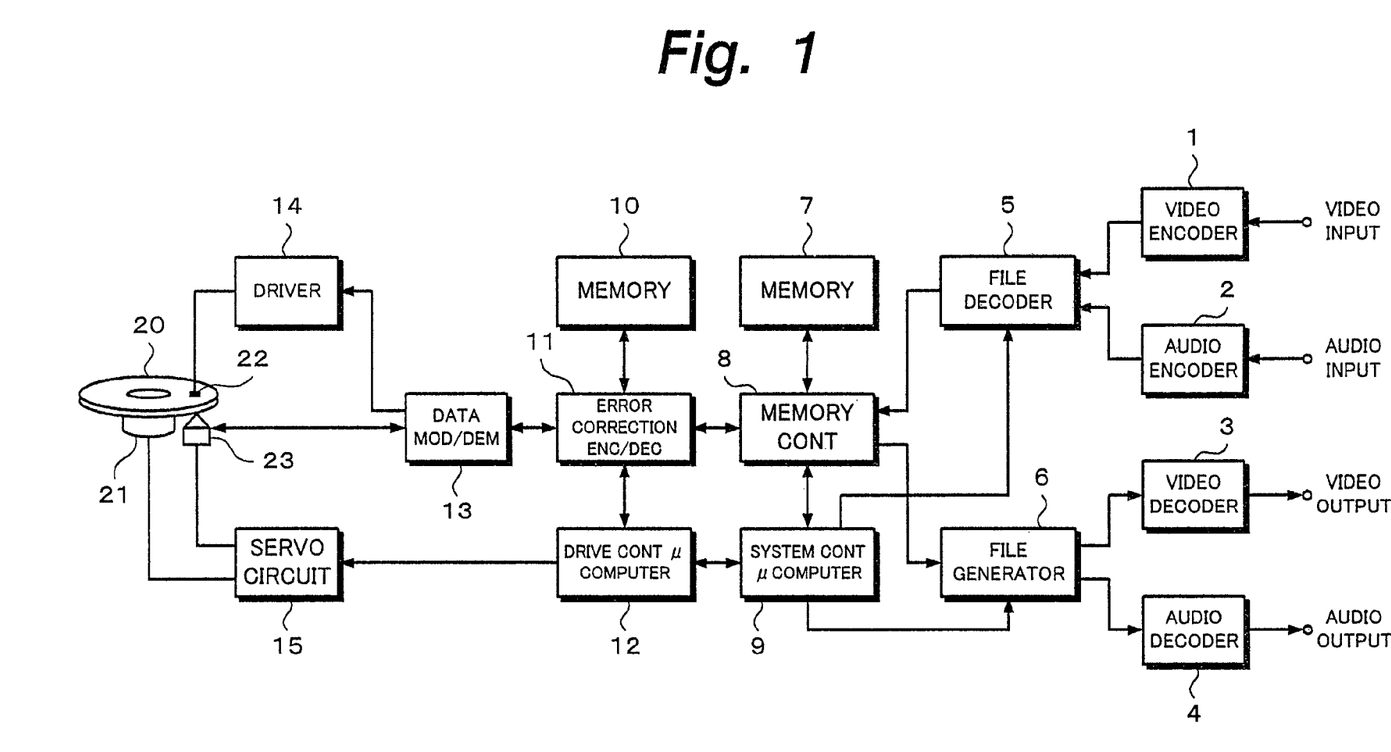
FIG. 1 is a block diagram showing the structure of an embodiment of the present invention.

Next, with reference to the accompanying drawings, an embodiment of the present invention will be described. FIG. 1 shows an example of the structure of a digital recording and reproducing apparatus according to the embodiment of the present invention. An input video signal is supplied to a video encoder 1 shown in FIG. 1. The video encoder 1 compression-encodes the video signal. In addition, an input audio signal is supplied to an audio encoder 2. The audio encoder 2 compression-encodes the audio signal. The compression-encoding method applied for the video signal and the audio signal is for example MPEG. Output signals of the video encoder 1 and the audio encoder 2 are referred to as elementary streams.

When MPEG is used, the video encoder 1 is composed of a motion predicting portion, a picture sequence rearranging portion, a subtracting portion, a DCT portion, a quantizing portion, a variable length code encoding portion, and a buffer memory. The motion predicting portion detects a moving vector. The subtracting portion forms a predictive error between an input picture signal and a locally decoded picture signal. The DCT portion transforms an output signal of the subtracting portion corresponding to the DCT method. The quantizing portion quantizes an output signal of the DCT portion. The variable length encoding portion encodes an output signal of the quantizing portion into a signal having a variable length. The buffer memory outputs the encoded data at a constant data rate. The picture sequence rearranging portion rearranges the sequence of pictures corresponding to the encoding process. In other words, the picture sequence rearranging portion rearranges the sequence of pictures so that after I and P pictures are encoded, a B picture is encoded. The local decoding portion is composed of an inverse quantizing portion, an inverse DCT portion, an adding portion, a frame memory, and a motion compensating portion. The motion compensating portion performs all of a forward predicting operation, a reverse predicting operation, and a bidirectional predicting operation. When the intra encoding process is performed, the subtracting portion directly passes data, not performs the subtracting process. The audio encoder 2 comprises a sub-band encoding portion and an adaptively quantized bit allocating portion.

As an example, in the case of a portable disc recording and reproducing apparatus with a built-in camera, a picture photographed by the camera is input as video data. In addition, a voice collected by a microphone is input as audio data. The video encoder 1 and the audio encoder 2 convert analog signals into digital signals. According to the embodiment of the present invention, a rewritable optical disc is used as a record medium. Examples of such an optical disc are a magneto-optical disc and a phase-change type disc. According to the embodiment of the present invention, a magneto-optical disc having a relatively small diameter is used.

Output signals of the video encoder 1 and the audio encoder 2 are supplied to a file generator 5. The file generator 5 converts output signals of the video encoder 1 and the audio encoder 2 into a video elementary stream and an audio elementary stream so that they can be handled corresponding to a computer software program for synchronously reproducing a moving picture and a sound without need to use a dedicated hardware portion. According to the embodiment of the present invention, for example, as such a software program, QuickTime is used. A sequence of data (video data, audio data, and text data) that varies on time base and that is process by QuickTime is referred to as QuickTime movie. The file generator 5 multiplexes encoded video data and encoded audio data. To generate a QuickTime movie file, a system controlling microcomputer 9 controls the file generator 5.

QuickTime movie files generated by the file generator 5 are successively written to a memory 7 through a memory controller 8. When the system controlling microcomputer 9 issues a data write request for a disc to the memory controller 8, the memory controller 8 reads a QuickTime movie file from the memory 7. In this example, the transfer rate of the encoding process for a QuickTime movie file is lower than that for data written to the disc. For example, the former is half of the latter. Thus, although QuickTime movie files are successively written to the memory 7, they are intermittently read from the memory 7 under the control of the system controlling microcomputer 9 in such a manner that the memory 7 is prevented from overflowing or underflowing.

A QuickTime movie file that is read from the memory 7 through the memory controller 8 is supplied to an error correction encoder/decoder 11. The error correction encoder/decoder 11 temporarily writes a QuickTime movie file to a memory 10. The error correction encoder/decoder 11 performs an interleaving process and an error correction code encoding process so as to generate redundant data. The error correction encoder/decoder 11 reads the QuickTime movie file with redundant data from the memory 10.

Output data of the error correction encoder/decoder 11 is supplied to a data modulator/demodulator 13. When digital data is recorded on the disc, the data modulator/demodulator 13 modulates the data in such a manner that a clock signal can be easily extracted so that data can be recorded on a disc free from a problem such as an inter-code interference. For example, RLL (1, 7) can be used.

An output signal of the data modulator/demodulator 13 is supplied to a magnetic field modulating driver 14. In addition, a signal for driving an optical pickup 23 is output to the magnetic field modulating driver 14. The magnetic field modulating driver 14 drives a magnetic field head 22 corresponding to the input signal so as to apply a magnetic field to an optical disc 20. The optical pickup 23 radiates a recording laser beam to the optical disc 20. In such a manner, data is recorded on the optical disc 20. The optical disc 20 is rotated at CLV (Constant Linear Velocity), CAV (Constant Angular Velocity), or ZCAV (Zone CLV of which the disc surface area is divided into for example three areas in each of which the optical disc 20 is rotated at CAV in such a manner that the velocity of the innermost area is the highest and the velocity of the outermost area is the lowest) so that their linear velocities nearly become the same.

Since data that is intermittently read from the memory controller 8 is recorded to the optical disc 20, data is not successively recorded. In other words, after a predetermined amount of data is recorded, the recording operation is stopped until the next record request is received.

When the system controlling microcomputer 9 issues a request to a drive controlling microcomputer 12, it issues a request to a servo circuit 15 so as to control the entire disc drive. Thus, the disc drive performs a recording operation. The servo circuit 15 performs a disc radial moving servo operation, a tracking servo operation, and a focus servo operation for the optical pickup 23. In addition, the servo circuit 15 performs a spindle servo operation for a motor 21. In association with the system controlling microcomputer 9, a user operation input portion (not shown) is disposed.

Next, the structure and operation of the reproducing portion will be described. When data is reproduced, a reproducing laser beam is radiated to the optical disc 20. A detector of the optical pickup 23 converts the reflected light of the optical disc 20 into a reproduction signal. A tracking error and a focus error are detected from an output signal of the detector of the optical pickup 23. The servo circuit 15 controls the optical pickup 23 so that the optical pickup 23 is placed and focused on a desired track. In addition, the servo circuit 15 controls the radial movement of the optical pickup 23 so that it reproduces data on a desired track of the optical disc 20.

As with the recording operation, when data is reproduced, the transfer rate of data reproduced from the optical disc 20 is higher than that of a QuickTime movie file. For example, the transfer rate of data reproduced form the optical disc 20 is twice as large as the transfer rate of a QuickTime movie file. Likewise, data is not successively reproduced from the optical disc 20. In other words, an intermittent reproducing operation is performed in such a manner that after a predetermined amount of data is reproduced, the reproducing operation is stopped until the next reproducing request is received. As with the recording operation, in the reproducing operation, when the system controlling microcomputer 9 issues a request to the drive controlling microcomputer 12, it issues a request to the servo circuit 15 so as to control the entire disc drive.

The reproduction signal that is output from the optical pickup 23 is input to the data modulator/demodulator 13. The data modulator/demodulator 13 demodulates the reproduction signal. The demodulated data is supplied to the error correction encoder/decoder 11. The error correction encoder/decoder 11 temporarily writes the reproduction data to the memory 10. The error correction encoder/decoder 11 performs a deinterleaving process and an error correcting process for the reproduction data. The error-corrected QuickTime movie file is written to the memory 7 through the memory controller 8.

A QuickTime movie file written to the memory 7 is output to a file decoder 6 in synchronization with a demultiplexing timing corresponding to a request issued by the system controlling microcomputer 9. The system controlling microcomputer 9 supervises the amount of data that is reproduced from the optical disc 20 and written to the memory 7 and the amount of data that is read from the memory 7 and output to the file decoder 6 so as to successively reproduce the video signal and the audio signal. In addition, the system controlling microcomputer 9 controls the memory controller 8 and the drive controlling microcomputer 12 so as to read data from the optical disc 20 in such a manner that the memory 7 does not overflow or underflow.

The file decoder 6 decodes a QuickTime movie file into a video elementary stream and an audio elementary stream under the control of the system controlling microcomputer 9. The video elementary stream is supplied to a video decoder 3. The audio elementary stream is supplied to an audio decoder 4. The video elementary stream and the audio elementary stream are synchronously output from the file decoder 6.

The video decoder 3 and the audio decoder 4 compression-decode the video elementary stream and the audio elementary stream and generate a video output signal and an audio output signal, respectively. In this example, the video signal and the audio signal have been encoded corresponding to MPEG. A video output signal is output to a display (liquid crystal display or the like) through a display driver and displayed as a picture. Likewise, an audio output signal is output to a speaker through an audio amplifier and reproduced as a sound (these structural portions are not shown).

The video decoder 3 is composed of a buffer memory, a variable length code decoding portion, an inverse DCT portion, an inverse quantizing portion, an adding portion, and a local decoding portion. The adding portion adds an output signal of the inverse quantizing portion and a local decoded output signal. The local decoding portion is composed of a picture sequence rearranging portion, a frame memory, and a motion compensating portion. When an intra encoding process is performed, the adding portion directly passes data, not performs the adding process. Decoded data is output from the adding portion to the picture sequence rearranging portion. The picture sequence rearranging portion rearranges the decoded pictures in the original order.

As was described above, since the optical disc 20 on which data is recorded is attachable and detachable, the data recorded on the optical disc 20 can be reproduced by another apparatus. For example, a personal computer that operates with QuickTime application software may read data recorded on the optical disc 20 and reproduce video data and audio data therefrom. It should be noted that the present invention can be applied to an apparatus that handles only video data or only audio data.

Next, the embodiment of the present invention will be described in more detail. First of all, with reference to FIG. 2, QuickTime will be described in brief. QuickTime is an OS expansion function for reproducing a moving picture without need to use dedicated hardware. There are various data formats for QuickTime. In other words, audio data, video data, MDI, and so forth of up to 32 tracks can be synchronously output.

Figure 2:
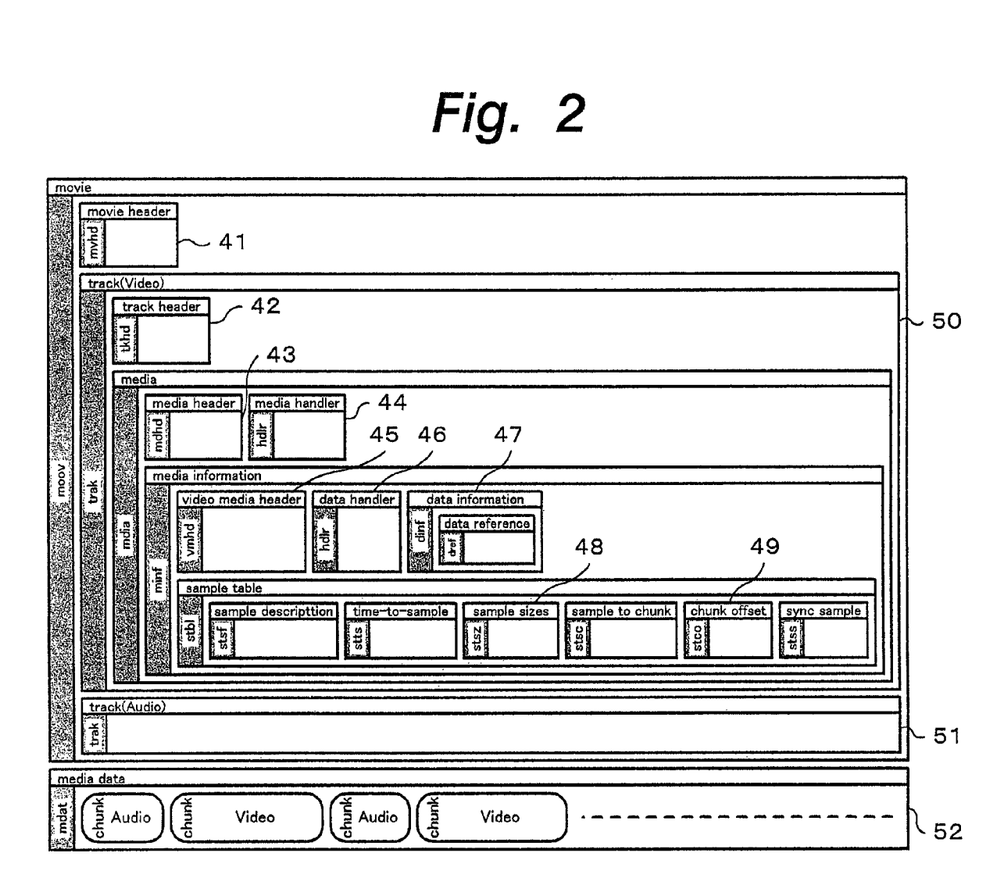
FIG. 2 is a schematic diagram showing an example of a QuickTime file format according to the present invention.

A QuickTime movie file is roughly divided into two major portions that are a movie resource portion and a movie data portion. The movie resource portion contains time data necessary for reproducing the QuickTime movie file and information necessary for referencing real data. The movie data portion contains real data of video data and real data of audio data.

One QuickTime movie file can contain different types of medium data such as a sound, a video, and a text as independent tracks that are a sound track, a video track, and a text track, respectively. These independent tracks are strictly controlled on time base. Each track has a medium for referencing the compression method of the real data and the display time period thereof. The medium contains the minimum sample size of the real data in the movie data portion, the position of a chunk that is a block of a plurality of samples, and the display duration of each sample.

FIG. 2 shows an example of a QuickTime file that handles audio data and video data. The largest structural portions of the QuickTime file are a movie resource portion and a movie data portion. The movie resource portion contains the duration necessary for reproducing the file and data necessary for referencing the real data. The movie data portion contains real data of video data, audio data, and so forth.

Next, the movie resource portion will be described in detail. The movie resource portion contains a movie header 41 and tracks. The movie header 41 contains general file information. There are a plurality of tracks corresponding to the number of types of data. FIG. 2 shows an example of the internal structure of a video track 50 in detail. The video track 50 contains a track header 42 and a medium portion. The track header 42 contains general track information. The medium portion contains a medium header 43, a medium handler 44, and a medium information portion. The medium header 43 contains general medium information. The medium handler 44 contains medium data handling information.

The medium information portion contains a medium handler 45, a data handler 46, data information 47, and a sample table. The medium handler 45 contains picture medium information. The data handler 46 contains picture data handling information. The data information 47 contains data information. The sample table contains a sample description, a time-to-sample, a sample size 48, a sample-to-chunk, a chunk offset 49, a sync sample, and so forth. The sample description contains each sample. The time-to-sample represents the relation between a sample and the time base. The sample size 48 represents the size of the sample. The sample-to-chunk represents the relation between the sample and the chunk. The chunk offset 49 represents the start byte position of the chunk in the movie file. The sync sample contains synchronous information. Likewise, an audio track 51 has a structure (not shown) similar to that of a video track.

On the other hand, the movie data portion contains audio data encoded corresponding to for example MPEG Audio Layer 2 and picture data encoded in the compression-encoding method corresponding to for example MPEG (Moving Picture Expert Group) method in the unit of chunks each of which is composed of a predetermined number of samples. However, it should be noted that the present invention is not limited to such an encoding method. In addition, the moving data portion may contain linear data that has not been compression-encoded.

Figure 3A:
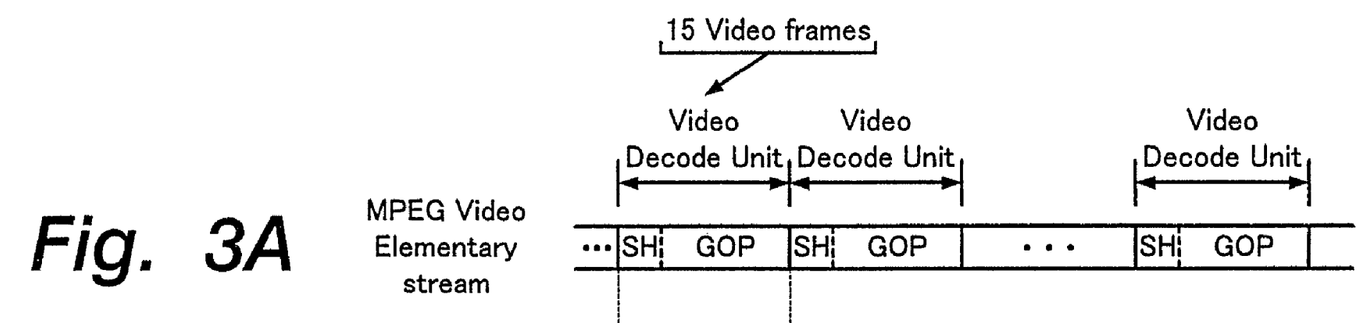
FIGS. 3A and 3B are schematic diagrams for explaining the relation between GOPs and a QuickTime file format according to the embodiment of the present invention.
Figure 3B:
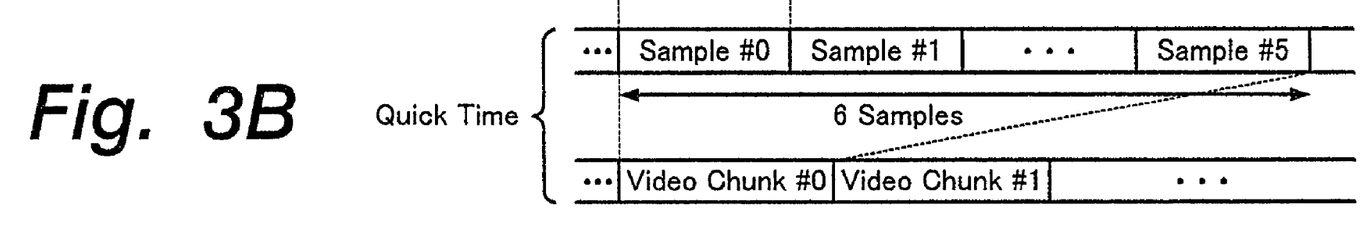

Each track of the movie resource portion is correlated with data contained in the movie data portion. In other words, in the example shown in FIG. 3, since audio data and video data are handled, the movie resource portion contains a video track and an audio track. The movie data portion contains real data of the audio data and real data of the video data. When other types of data are handled, the movie resource portion contains their tracks and the movie data portion contains real data thereof. For example, when a text and MIDI are handled, the movie resource portion contains tracks of the text and the MIDI and the movie data portion contains real data thereof.

Next, a method for converting compressed video data (video elementary stream) and compressed audio data (audio elementary stream) into a QuickTime file format in the case that MPEG2 is used as a decoding method for data that has been compression-encoded will be described. First of all, MPEG will be described. MPEG has a hierarchical structure of six layers that are a sequence layer, a GOP layer, a picture layer, a slice layer, a macro block layer, and a block layer in the order of the highest hierarchical level. A header is placed at the beginning of each of the six layers. For example, a sequence header is a header placed at the beginning of the sequence layer. The sequence header contains a sequence start code, a horizontal screen size, a vertical screen size, an aspect ratio, a picture rate, a bit rate, a VBV buffer size, a restriction parameter bit, a load flag of two quantized matrixes, and a content.

According to MPEG, there are three picture types I, P, and B. In an I picture (Intra-coded picture), when a picture signal is encoded, information of only one picture is used. Thus, when an encoded picture signal is decoded, information of only the I picture is used. In a P picture (Predictive-coded picture), as a predictive picture (a reference picture for obtaining a difference with the current P picture), an I picture or another P picture that has been decoded is temporally followed by the current P picture. The difference between the current P picture and a motion-compensated predictive picture is encoded for each macro block. Alternatively, the current P picture is encoded for each macro block without obtaining the difference of such pictures. One of those methods is selected whichever higher efficiency is obtained. In a B picture (Bidirectionally predictive-coded picture), as predictive pictures (reference pictures for obtaining a difference with the current B picture), three types of reference pictures are used. The first type reference picture is an I picture or a P picture that has been decoded and that is temporally followed by the current B picture. The second type reference picture is an I picture or a P picture that has been decoded and that is temporally preceded by the current B picture. The third type reference picture is an interpolated picture of the first type reference picture and the second type reference picture. The difference between the current B picture and each of. the three type reference pictures that have been motion-compensated is encoded for each macro block. Alternatively, the current B picture is encoded for each macro block without obtaining such a difference. One of those methods is selected whichever higher efficiency is obtained.

Thus, there are a frame intra-coded macro block, a forward inter-frame predictive macro frame (a future macro block is predicted with a past macro block), a backward inter-frame predictive macro block (a past macro block is predicted with a future macro block), and a bidirectional macro block (a current macro block is predicted with both a future macro block and a past macro block). All macro blocks in an I picture are intra-frame coded macro blocks. A P picture contains intra-frame coded macro blocks and forward inter-frame predictive macro blocks. A B picture contains the above-described four types of macro blocks.

In MPEG, a GOP (Group Of Pictures) structure that is a group of pictures is defined so that data can be random-accessed. In MPEG, a GOP is defined as follows. The first picture of one GOP is an I picture. The last picture of one GOP is an I picture or a P picture. A GOP that is predicted with the last I or P picture of the preceding GOP is permitted. A GOP that can be decoded without a picture of the preceding GOP is referred to as closed GOP. According to the embodiment, as a structure of a closed GOP, each GOP can be edited.

In MPEG audio (compressing method), three modes of layer 1, layer 2, and layer 3 have been defined. In layer 1, for example 32 sub-band encoding operation and adaptive bit allocating operation are performed. One audio decoding unit is composed of 384 samples. One audio decoding unit is one audio frame of an audio bit stream. The audio decoding unit is the minimum unit of which encoded data is decoded to audio data. Likewise, the video decoding unit corresponding to one video frame has been defined. In NTSC system, one video frame is equivalent to 1/30 seconds. Normally, the bit rate of stereo audio in layer 1 is 256 kbps. In layer 2, a 32 sub-band encoding operation and an adaptive bit allocating operation are performed. One audio decoding unit is composed of 1152 samples. Normally, the bit rate of stereo audio in layer 2 is 192 kbps.

The file generator 5 converts video data and audio data that have been compressed corresponding to MPEG into a file structure corresponding to the above-described QuickTime file format. FIGS. 3A and 3B show the relation among video frames, GOPs, and units of samples and chunks of the Quick-Time file format. As was described above, one sample is the minimum unit of movie data. One chunk is a unit of which a plurality of samples are collected as a block.

As shown in FIG. 3A, for example 15 video frames of an original video signal are compression-encoded corresponding to MPEG2 and thereby one GOP is generated. 15 video frames are equivalent to 0.5 seconds. Each GOP is preferably structured as a closed GOP. A sequence header is placed at the beginning of each GOP. The sequence header and one GOP compose one video decoding unit. Since a sequence header is placed to each GOP, each sample can be directly edited and decoded with QuickTime. The video encoder 1 shown in FIG. 1 outputs an MPEG video elementary stream shown in FIG. 3A.

As shown in FIG. 3B, one video decoding unit is treated as one sample of the QuickTime file format. Six chronologically successive samples (for example, sample #0 to sample #5) are treated as one video chunk (for example, chunk #0). The duration of one chuck is 3 seconds. Alternatively, six GOPs may be treated as one video chunk so that one chunk corresponds to one sample. In this case, the duration of one chuck is 3 seconds.

Figure 4A:
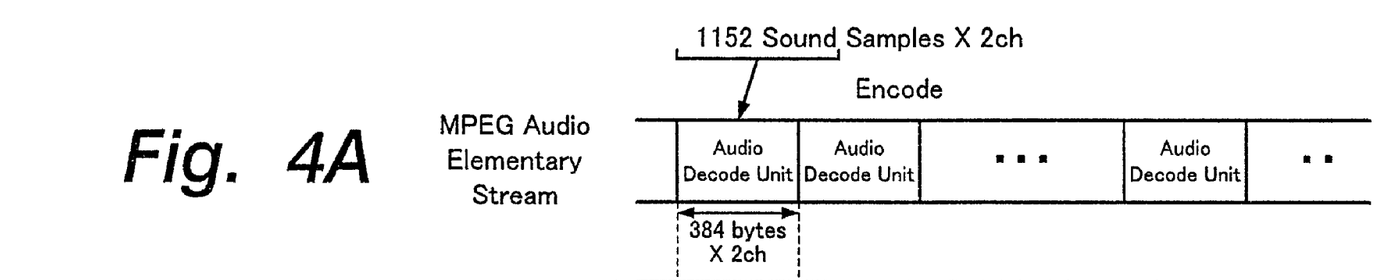
FIGS. 4A and 4B are schematic diagrams for explaining the relation between a compression-encoded audio and a QuickTime file format according to the embodiment of the present invention.
Figure 4B:
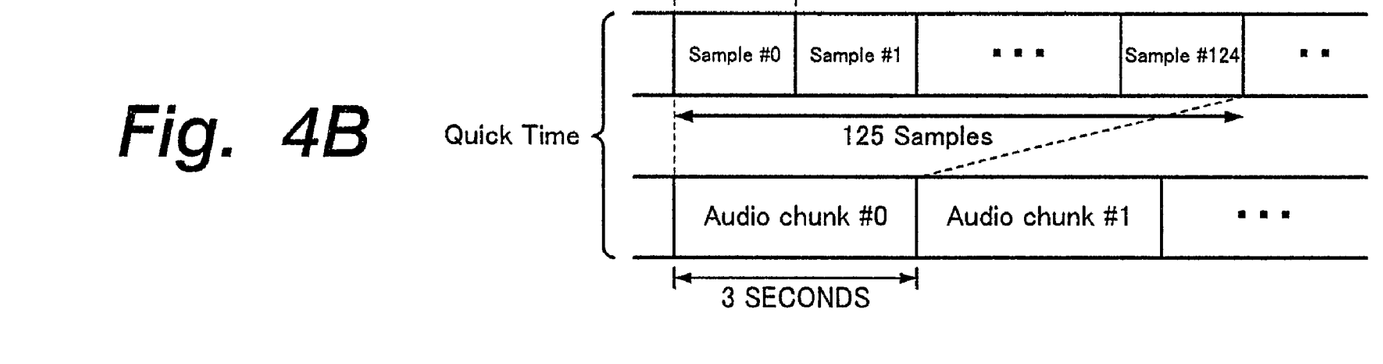

FIGS. 4A and 4B show the relation among audio frames encoded corresponding to MPEG audio layer 2, GOPs, and units of samples and chunks in the QuickTime file format. In layer 2, 1152 audio samples/channel are treated as one audio frame. As shown in FIG. 4A, in stereo, 1152 audio samples×2 channels are encoded in layer 2 and treated as one audio decoding unit. One audio decoding unit contains data of 384 bytes×2 channels that have been compression-encoded. The audio decoding unit contains a header and information necessary for decoding the encoded data (allocation, scale factor, and so forth).

As shown in FIG. 4B, one audio decoding unit is treated as one sample of the QuickTime file format. Thus, each audio sample can be decoded with QuickTime. 125 chronological successive samples (for example, sample #0 to sample #124) are treated as one audio chunk (for example, chuck #0). The duration of one chuck is 3 seconds in the case that the audio sampling frequency is 48 kHz.

In FIGS. 3A, 3B, 4A, and 4B, a video data file and an audio data file are separately shown. The file generator 5 multiplexes a video data file and an audio data file as one data stream and thereby generates a QuickTime movie file. In the QuickTime movie file, video chunks and audio chucks are alternatively placed on time base. In this case, video chunks and audio chunks are placed in such a manner that a video chuck adjacents to an audio chunk corresponding thereto. As was described above, the duration of video data of one video chunk is equal to the duration of audio data of one audio chunk (for example, 3 seconds).

As another example of the audio compression-encoding method, ATRAC (Adaptive Transform Acoustic Coding) used for Mini Disc may be used. In ATRAC, audio data of 16 bits sampled at 44.1 kHz is processed. The minimum data unit processed in ATRACK is one sound unit. In stereo, one sound unit is composed of 512 samples×16 bits×2 channels.

Figure 5A:
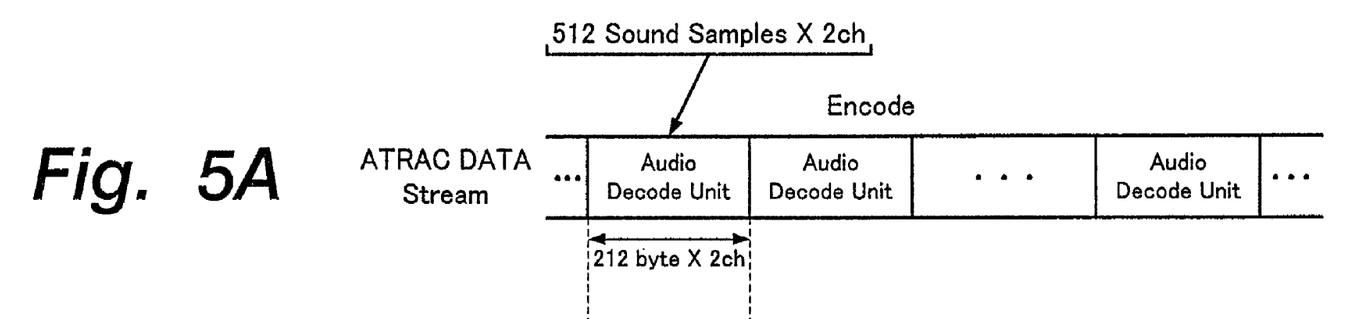
FIGS. 5A and 5B are schematic diagrams for explaining another example of the relation between a compression-encoded audio and a QuickTime file format according to the embodiment of the present invention.
Figure 5B:
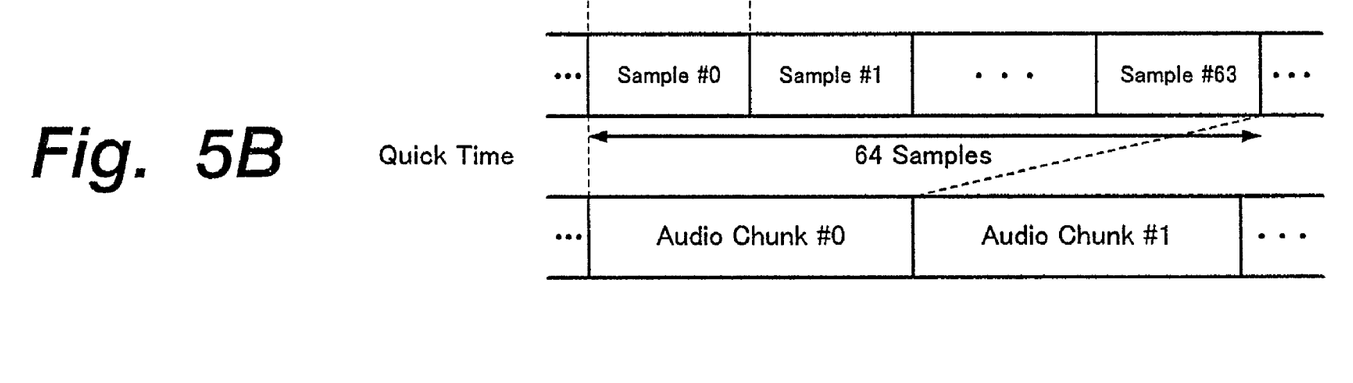

When ATRACK is used as an audio compression-encoding method, as shown in FIG. 5A, one sound unit is compressed to an audio decoding unit of 212 bytes×2 channels. As shown in FIG. 5B, one audio decoding unit is treated as one sample in the QuickTime file format. 64 samples are treated as one chunk in the QuickTime file format.

According to the present invention, the audio data may be recorded on a non-compression basis. The non-compression method is referred to as linear PCM. Likewise, in linear PCM, 512 audio samples are treated as one audio decoding unit. One audio decoding unit is treated as one sample in the QuickTime file format.

Figures 6A, 6B, 6C:
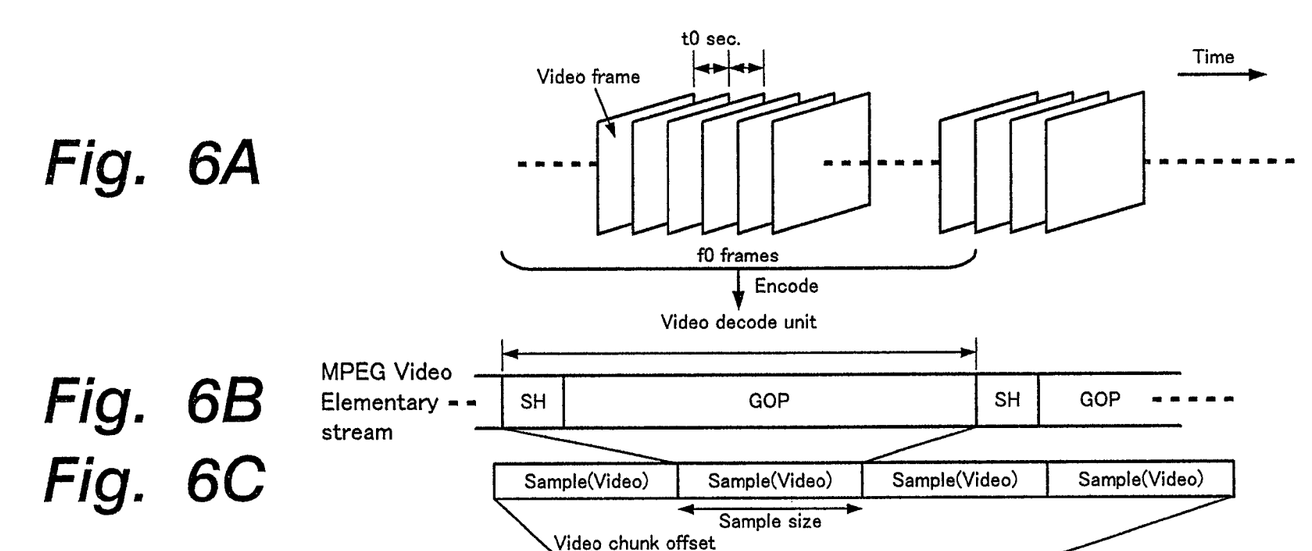
FIGS. 6A, 6B, 6C, and 6D are schematic diagrams for explaining the relation between GOPs of an MPEG video and a QuickTime file format according to the embodiment of the present invention.

FIGS. 6A, 6B, 6C, and 6D show a QuickTime file format for video data in the case that video data and audio data are multiplexed. As shown in FIG. 6A, the period of a video frame is t0 seconds and the number of frames of one GOP is f0. When original video data is encoded corresponding to MPEG2, an MPEG video elementary stream shown in FIG. 6B is formed. As was described above, a sequence header (SH) is placed to each GOP.

Figure 6D:
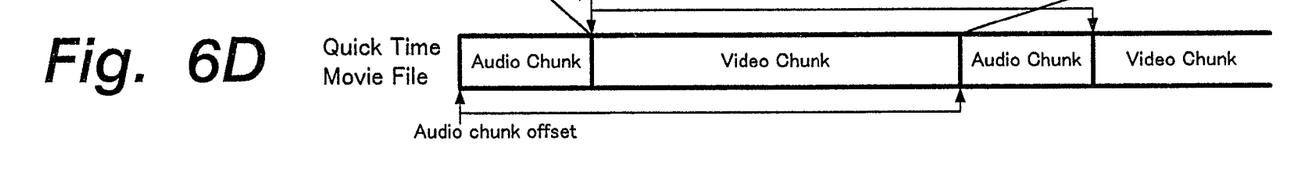

As shown in FIG. 6C, one GOP with a sequence header is treated as one sample in the QuickTime file format. The length of one sample is referred to as sample size. With a plurality of samples (for example, six samples), one chunk is composed in the QuickTime file format. As shown in FIG. 6D, video chunks and audio chunks are alternately placed on time base and thereby multiplexed. As a result, a QuickTime movie file is formed. The beginning of each video chunk of the QuickTime movie file is referred to as video chunk offset. The video chunk offset is represented by the number of bytes from the beginning of the file to the beginning of the video chunk.

Figure 7A:
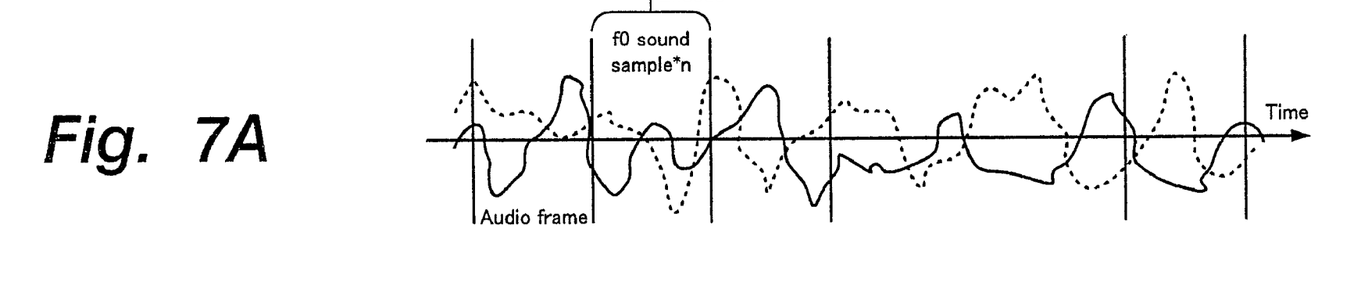
FIGS. 7A, 7B, 7C, and 7D are schematic diagrams for explaining an example of the relation between a compression-encoded audio and a QuickTime file format according to the embodiment of the present invention.
Figure 7B:
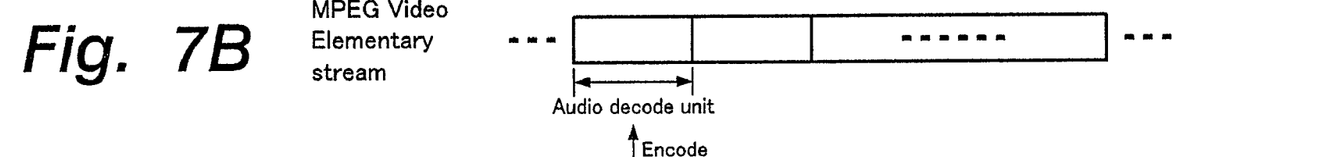

FIGS. 7A, 7B, 7C, and 7D show a QuickTime file format of audio data in the case that video data and audio data are multiplexed. As shown in FIG. 7A, an original audio signal is digitized. One audio frame contains f0 audio samples×n channels. When the original audio data is compression-encoded corresponding to MPEG audio, an MPEG audio elementary stream shown in FIG. 7B is formed.

Figure 7C:
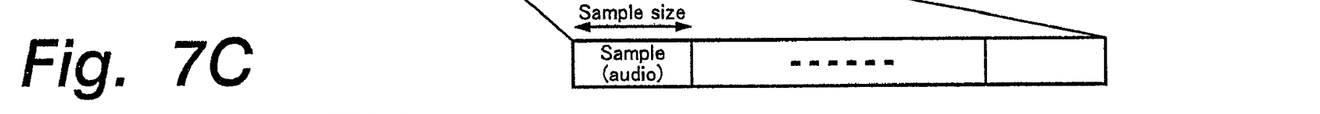
Figure 7D:
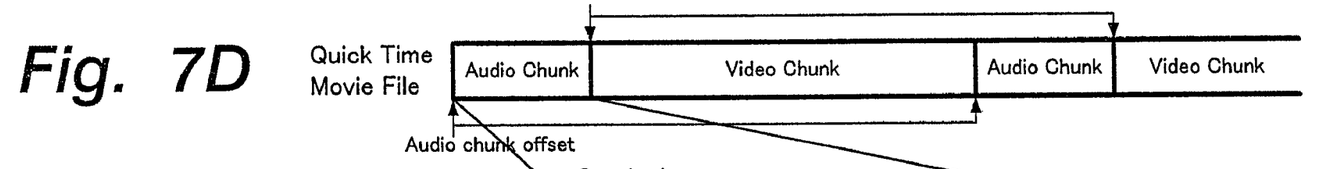

As shown in FIG. 7C, for example one audio decoding unit is treated as one sample of the QuickTime file format. The size of one sample is referred to as sample size. A plurality of samples (for example, 125 samples) composes one chunk of the QuickTime file format. As shown in FIG. 7D, video chunks and audio chunks are alternately placed and thereby multiplexed. As a result, a QuickTime movie file is formed. The beginning of each audio chunk of a QuickTime movie file is referred to as audio chunk offset. The audio chunk offset is represented by the number of bytes from the beginning of the file to the beginning of the audio chunk. The duration of each video chunk is the same as the duration of each audio chunk. For example, the duration is 3 seconds.

The sample size of a video sample, the sample size of an audio sample, the offset value of a video chunk, and the offset value of an audio chunk are contained in the resource of a QuickTime movie file. With the resource, each sample of each chunk can be designated and edited (in the encoding unit).

Figure 8:
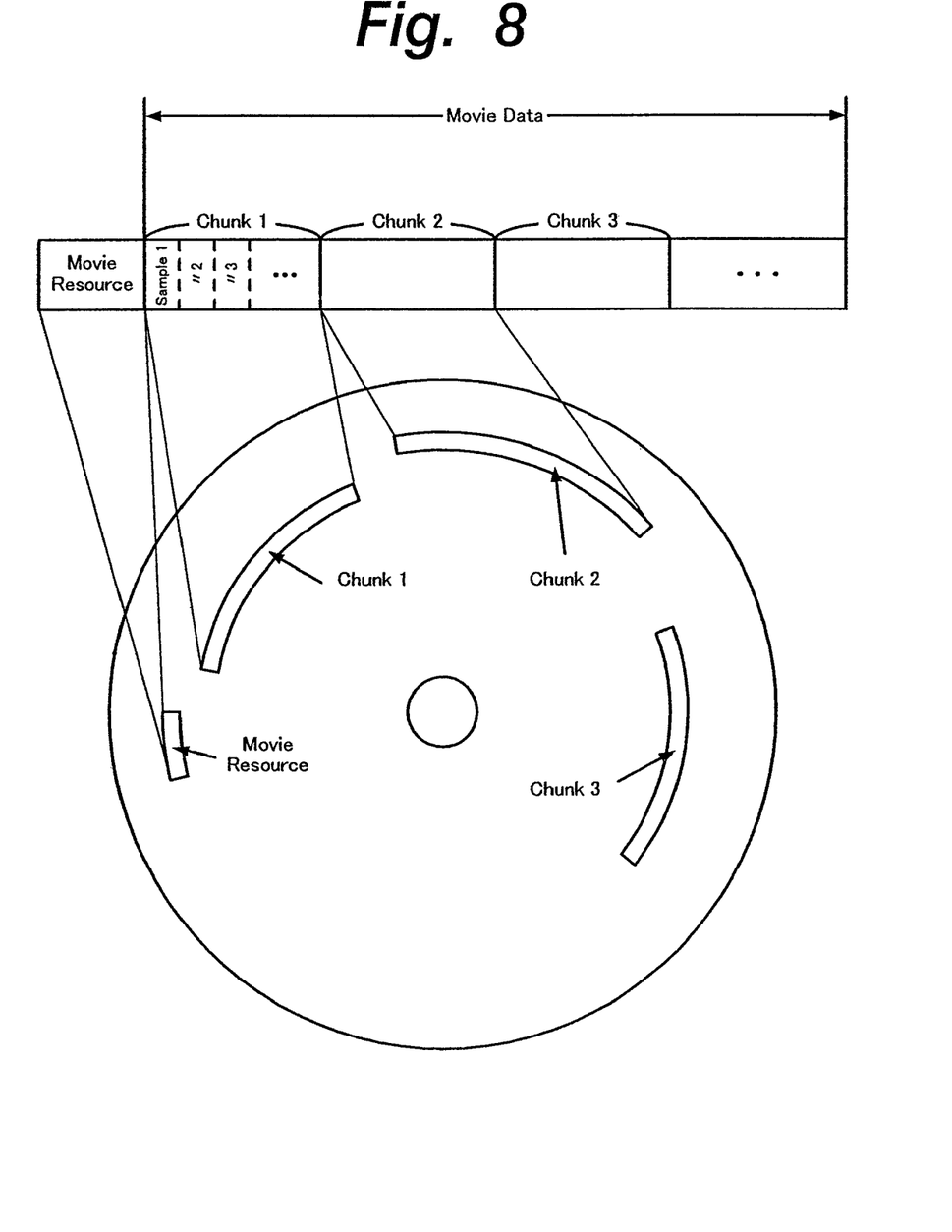
FIG. 8 is a schematic diagram for explaining an example of a recording method for an optical disc according to the embodiment of the present invention.

Next, as mentioned above, a recording method for recording a QuickTime movie file of which video chunks and audio chunks have been multiplexed (interleaved) to the optical disc 20 will be described. As described above, one QuickTime file format is roughly divided into two major portions that are a movie resource portion and a movie data portion. When a QuickTime movie file is recorded to the optical disc 20, as shown in FIG. 8, the movie resource is matched with the successive record length. In addition, each chunk (video chunk or audio chunk) of the movie data (real data) is matched with the successive record length of the disc. The successive record length means the length of which data can be written to successive addresses without a jumping operation of the optical pickup 23.

Figure 9:
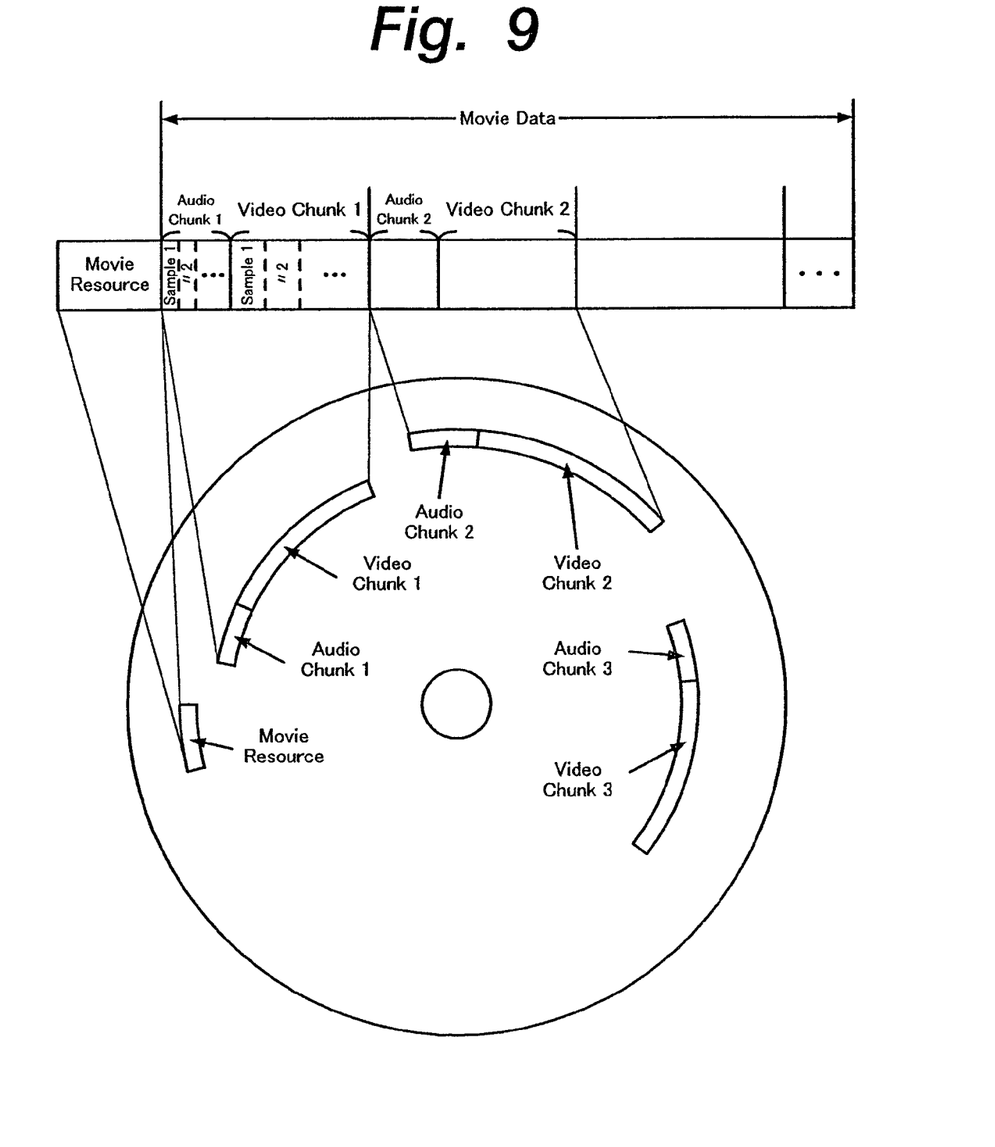
FIG. 9 is a schematic diagram for explaining another example of a recording method for an optical disc according to the embodiment of the present invention.

FIG. 9 shows another example of which a QuickTime movie file is recorded on the optical disc 20. As described above, when video chunks and audio chunks have been multiplexed, a pair of an audio chunk and an adjacent video that corresponds thereto is matched with the successive record length.

As shown in FIGS. 8 and 9, the position of the successive record length is physically not continuous. Thus, after the movie resource is reproduced, when the first audio chunk and video chunk are reproduced (namely, data of two successive record lengths is reproduced), a track jump takes place. However, as was described above, since the data transfer rate of write/read operation is higher (for example, two times higher) than the data transfer rate of a QuickTime movie file, even if data is intermittently read, successive QuickTime movie files can be reproduced.

Thus, the transfer rate of a QuickTime movie file, the read rate of data from the optical disc, the duration of the successive record length, and the seek time of the disc drive (the seek time is the duration necessary for a track jump from one track to another track) mutually relate. Thus, the duration of video data and audio data recorded in the successive record length can be selected in various manners from other than 3 seconds. It is preferred that in the duration for video frames of video data recorded in the successive record length, an integer number of audio samples are placed.

When the duration of video data and the duration of audio data recorded in the successive record length are not fixed, the movie resource of the QuickTime movie file contains the successive record length. For example, the movie resource contains the number of frames in one video chunk and the number of samples in one audio sample.

In the above description, the present invention is applied to a portable disc recording and reproducing apparatus with built-in camera. It should be noted that the present invention can be applied to other apparatuses. For example, the present invention can be applied to a digital still camera and a digital audio recorder and player.

In addition, according to the present invention, part or all of the hardware structure shown in the block diagram of FIG. 1 can be accomplished by software. The software is stored on a computer readable record medium such as a CD-ROM.

In the above embodiment, the present invention was applied to QuickTime. However, it should be noted that the present invention can be applied to computer software that allows a plurality of sequences of data to be synchronously reproduced without need to use dedicated hardware.

According to the present invention, since at least one GOP in MPEG compression video corresponds to the first data unit (sample) of a file such as QuickTime, each of plurality of types of data can be accessed and edited. In addition, when data with a file structure is recorded on an optical disc, since the successive record length corresponds to the second data unit (for example, a chunk of QuickTime), the accessibility and editing efficiency can be improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A portable recording apparatus having a built-in camera for recording data to a record medium, comprising:
   a camera for acquiring an image;
   a video input for inputting video data representing the acquired image;

a video encoder for encoding video data in a group structure of a plurality of frames by performing a compression-encoding process;

a video data output for outputting the encoded video data;

an audio data output for outputting compression-encoded or non-compressed audio data;

a management data generator for generating management data which manages said encoded video data and said audio data;

a transformer for transforming the data structure of said encoded video data, the outputted audio data, and the management data into a file structure; and a recorder for recording said transformed encoded video data, the audio data, and the management data to a record medium, wherein the file structure contains a first video data unit which corresponds to a predetermined number of frames of said encoded video data, a first audio data unit which corresponds to a predetermined number of sound samples of said audio data, a second video data unit which comprises a plurality of said first video data units, and a second audio data unit which comprises a plurality of said first audio data units, wherein said second video data unit and said second audio data unit are recorded on a successive location of said record medium respectively; and wherein said management data includes video track data and audio track data of independent data structure, and wherein the video track data contains a size quantity of the first video data unit and a start position of the second video data unit and the audio track data contains a size quantity of said first audio data unit and a start position of said second audio data unit, respectively.

2. The portable recording apparatus of claim 1, wherein said group structure is a group of pictures (GOP) and a GOP corresponds to said first video data unit.

3. The portable recording apparatus of claim 1, wherein each of the second video data unit and the second audio data unit are matched with a successive record length of the record medium.

4. The portable recording apparatus of claim 1, wherein a pair of the second audio data unit and an adjacent second video data unit is matched with a successive record length of the record medium.

5. The portable recording apparatus of claim 1, wherein said record medium is a disc medium.

6. A digital camera for recording video data to a record medium, comprising:

a camera for acquiring an image;

a video input for inputting video data representing said image;

a video encoder for encoding video data in a group structure of a plurality of frames by performing a compression-encoding process;

a video data output for outputting the encoded video data;

an audio data output for outputting compression-encoded or non-compressed audio data;

a management data generator for generating management data which manages said encoded video data and said audio data;

a transformer for transforming the data structure of said encoded video data, the outputted audio data, and the management data into a file structure; and a recorder for recording said transformed encoded video data, the audio data, and the management data to a record medium, wherein the file structure contains a first video data unit which corresponds to a predetermined number of frames of said encoded video data, a first audio data unit which corresponds to a predetermined number of sound samples of said audio data, a second video data unit which comprises a plurality of said first video data units, and a second audio data unit which comprises a plurality of said first audio data units, wherein said second video data unit and said second audio data unit are recorded on a successive location of said record medium respectively; and wherein said management data includes video track data and audio track data of independent data structure, and wherein the video track data contains a size quantity of the first video data unit and a start position of the second video data unit and the audio track data contains a size quantity of said first audio data unit and a start position of said second audio data unit, respectively.

7. The portable recording apparatus of claim 6, wherein said group structure is a group of pictures (GOP) and a GOP corresponds to said first video data unit.

8. The portable recording apparatus of claim 6, wherein each of the second video data unit and the second audio data unit are matched with a successive record length of the record medium.

9. The portable recording apparatus of claim 6, wherein a pair of the second audio data unit and an adjacent second video data unit is matched with a successive record length of the record medium.

10. The portable recording apparatus of claim 6, wherein said record medium is a disc medium.

11. A recording method for recording data to a record medium, comprising the steps of:

acquiring an image inputting video data representing the acquired image;

encoding video data in a group structure of a plurality of frames by performing a compression-encoding process;

outputting the encoded video data;

outputting compression-encoded or non-compressed audio data;

generating management data which manages said encoded video data and said audio data;

transforming the data structure of said encoded video data, the outputted audio data, and the management data into a file structure; and recording said transformed encoded video data, the audio data, and the management data to a record medium, wherein the file structure contains a first video data unit which corresponds to a predetermined number of frames of said encoded video data, a first audio data unit which corresponds to a predetermined number of sound samples of said audio data, a second video data unit which comprises a plurality of said first video data units, and a second audio data unit which comprises a plurality of said first audio data units, wherein said second video data unit and said second audio data unit are recorded on a successive location of said record medium respectively; and wherein said management data includes video track data and audio track data of independent data structure, and wherein the video track contains a size quantity of the first video data unit and a start position of the second video data unit and the audio track contains a size quantity of said first audio data unit and a start position of said second audio data unit respectively.

12. The recording method of claim 11, wherein said group structure is a group of pictures (GOP) and a GOP corresponds to said first video data unit.

13. The recording method of claim 11, wherein each of the second video data unit and the second audio data unit are matched with a successive record length of the record medium.

14. The recording method of claim 11, wherein a pair of the second audio data unit and an adjacent second video data unit is matched with a successive record length of the record medium.

15. The recording method of claim 11, wherein said record medium is a disc medium.

16. A recording apparatus for recording data to a record medium, comprising:
   management data generating means for generating management data which manages video and audio data;
   transforming means for transforming the data structure of the video data, the audio data and the management data into a file structure; and
   recording means for recording said transformed video, audio and management data to a record medium,
   wherein the file structure contains a first video data unit which corresponds to a predetermined number of frames of said video data, a first audio data unit which corresponds to a predetermined number of sound samples of said audio data, a second video data unit which comprises a plurality of said first video data units, and a second audio data unit which comprises a plurality of said first audio data units,
   wherein said second video data unit and said second audio data unit are recorded on a successive location of said record medium respectively; and
   wherein said management data includes video track data and audio track data of independent data structure, and
   wherein the video track data contains a size quantity of the first video data unit and a start position of the second video data unit and the audio track data contains a size quantity of said first audio data unit and a start position of said second audio data unit, respectively.

\* \* \* \* \*